United States Patent
Letas (10) Patent No.: US 8,368,239 B2
(45) Date of Patent: Feb. 5, 2013

(54) DRIVE CIRCUIT AND METHOD FOR INVERTERS OF WIND ENERGY INSTALLATIONS

(75) Inventor: Heinz-Hermann Letas, Gross Meinsdorf (DE)

(73) Assignee: REpower Systems AG, Hamburg (DE)

( * ) Notice: Subject to any disclaimer, the term of this patent is extended or adjusted under 35 U.S.C. 154(b) by 901 days.

(21) Appl. No.: 12/487,924

(22) Filed: Jun. 19, 2009

(65) Prior Publication Data
US 2009/0322086 A1 Dec. 31, 2009

(30) Foreign Application Priority Data
Jun. 19, 2008 (DE) .......................... 10 2008 028 809

(51) Int. Cl.
*F03P 9/04* (2006.01)
(52) U.S. Cl. .......................... 290/44; 322/24
(58) Field of Classification Search .................. 290/43, 290/44, 54, 55; 322/24, 37
See application file for complete search history.

(56) References Cited

U.S. PATENT DOCUMENTS

| | | | |
|---|---|---|---|
| 5,083,039 A * | 1/1992 | Richardson et al. | 290/44 |
| 7,456,510 B2 * | 11/2008 | Ito et al. | 290/44 |
| 7,545,052 B2 * | 6/2009 | Llorente Gonzalez et al. | 290/44 |
| 7,579,702 B2 * | 8/2009 | Park et al. | 290/44 |
| 7,952,214 B2 * | 5/2011 | Ichinose et al. | 290/44 |
| 7,989,974 B2 * | 8/2011 | Fortmann et al. | 290/44 |
| 8,013,459 B2 * | 9/2011 | Ito et al. | 290/44 |
| 8,084,875 B2 * | 12/2011 | Letas | 290/44 |
| 8,097,971 B2 * | 1/2012 | Ichinose et al. | 290/44 |
| 2003/0053323 A1 | 3/2003 | Kimura et al. | |

FOREIGN PATENT DOCUMENTS

DE 102 43 602 A1 4/2003

* cited by examiner

*Primary Examiner* — Nicholas Ponomarenko
(74) *Attorney, Agent, or Firm* — Morrison & Foerster LLP (57) ABSTRACT

A converter for a wind energy installation and a method. The converter includes an inverter which drives a generator via a plurality of phases and an intermediate circuit having an intermediate-circuit voltage between an upper and a lower intermediate-circuit potential. The generator is driven with phase potentials at a variable frequency. A shift value is calculated between an extreme phase potential and one of the intermediate-circuit potentials, a separation value is determined between a middle phase potential and the closest intermediate-circuit potential, and an additional voltage is generated using the separation value as amplitude. The phase potentials are shifted through the shift value and the additional voltage is added to the middle phase potential. Accordingly, the switching elements in the converter do not need to be clocked in every second half-cycle resulting in reduced switching losses and increased current load capacity of the converter.

15 Claims, 4 Drawing Sheets

DRIVE CIRCUIT AND METHOD FOR INVERTERS OF WIND ENERGY INSTALLATIONS

REFERENCE TO RELATED APPLICATIONS

This application claims the priority of German Patent Application No. 10 2008 028 809.8, filed Jun. 19, 2008, the contents of which are incorporated herein by reference.

FIELD OF THE INVENTION

The invention relates to a drive circuit for converters of wind energy installations comprising an inverter which has a plurality of phases for connection of a generator, in particular a double-fed asynchronous generator, and an intermediate circuit which is connected to the inverter. The invention also relates to a method for operation of a converter having a drive circuit such as this, and to a wind energy installation equipped with it.

BACKGROUND OF THE INVENTION

Modern wind energy installations are designed for variable rotation speeds. This means that the wind rotor revolves at a rotation speed which is governed by the load, and that the generator produces electrical power at a correspondingly variable frequency. In order to allow this variable-frequency electrical power to be fed into a fixed-frequency supply network, a converter is provided, and is connected to the generator. Converters such as these normally comprise two inverters, one of which acts as a rectifier, and which are connected via a DC voltage or direct-current intermediate circuit. In this case, one of the inverters is connected to the network and has the network frequency applied to it during operation (network-side inverter), while the other inverter (machine-side inverter) is connected to the generator, with the frequency at it being governed inter alia by the rotation speed of the wind rotor. Converters such as these may be in the form of full converters or partial converters, the latter in particular in combination with a double-fed asynchronous machine. It has been found that operation in the region of the synchronous rotation speed (synchronization point) results in problems. In the region around the synchronization point, the frequency at the machine-side inverter is very low, and, in the extreme, may even become direct current when precisely at the synchronization point. As a result of the low frequencies, phases with a severe thermal load and phases with a light thermal load no longer alternate sufficiently quickly, as a result of which the switching elements which are in each case switched on, in particular, are subject to an increased thermal load. This adversely affects the life of the switching elements, and can lead to them failing. During operation in the region of the synchronization point, when the frequency acting on the machine-side inverter can accordingly reach very low values, which may be down to zero, the maximum permissible current load on the switching elements is reduced. This can lead to the maximum permissible current load being reduced by up to half. However, from the mechanical point of view, a reduction in the maximum permissible current actually means that the maximum permissible torque acting on the wind rotor is limited to a correspondingly greater extent. In consequence, the controllable rotation-speed range around the synchronization point is restricted by the more greatly limited, that is to say reduced, torque. This runs contrary to the concept of the variable rotation-speed wind energy installation and prevents the use of rotation-speed/torque characteristics with high torques beyond the synchronization point, as is required, for example, for low-noise operation at a reduced rotation speed or for rapidly passing through rotation-speed ranges in order to avoid tower resonances.

In the case of power converters, in particular for AC motors, it is admittedly known for a potential shift to be carried out for individual phases, in such a way that they are clamped at an intermediate-circuit potential and the pulsing can therefore be suspended at times (DE-A-102 43 602). In this case, the phase with the greatest magnitude is clamped at one of the intermediate-circuit potentials, as a result of which the pulsing can be suspended. Furthermore, the phase with the second greatest potential magnitude is clamped to one intermediate-circuit potential or the other alternately, depending on the phase angle. The latter phase is therefore operated at a reduced switching frequency. This is sufficient for driving motors, but, in the case of variable rotation-speed wind energy installations, can lead to the pulse repetition frequency of the relevant switching elements falling excessively during operation in the region of the synchronous rotation speed and therefore still increasing the thermal load, particularly on the switching elements for this phase. In fact, this known power converter is therefore not actually suitable for use with variable rotation-speed wind energy installations.

SUMMARY OF THE INVENTION

The invention is based on the object of specifying an improved method for operation of the converter, and a corresponding converter for wind energy installations as well as a wind energy installation provided with it, in which this disadvantage is reduced.

In the case of a method for operation of a converter of wind energy installations, which comprises an inverter which drives a generator via a plurality of phases, and an intermediate circuit having an intermediate-circuit voltage between an upper and a lower intermediate-circuit potential, with the generator being driven with phase potentials at a variable frequency, the invention provides for calculation of a shift value between an extreme phase potential and one of the intermediate-circuit potentials, determination of a separation value between the middle phase potential and the closest of the intermediate-circuit potentials, generation of an additional voltage using the separation value as amplitude, and shifting of the phases through the shift value, and addition of the additional voltage to the middle phase potential. The expression an extreme phase potential means the highest or lowest phase potential.

The invention is based on the discovery that the effective voltages for the generator result from the difference voltages between the phase connections of the inverter, to be more precise the difference voltages between the inverter half-bridges, with the absolute level of the potentials on the phases of the inverter being irrelevant. The invention in this case makes use of the fact that, although simultaneous shifting of the phase potentials of the inverter upward or downward leads to a change in the absolute level of the potential, this has no influence on the effective output voltage at the generator, since an absolute potential shift is cancelled out during the subtraction process for voltage calculation. The invention now makes use of this discovery by shifting the potentials of the inverter simultaneously, in time with the frequency. This is preferably done alternately upward and downward, to be precise separately for each half-cycle, with an up-shift value between the upper intermediate-circuit potential and the highest phase potential being calculated for a first half-cycle, and with a down-shift value between the lower intermediate-circuit potential and the lowest phase potential being calculated for the second half-cycle. Furthermore, a first and a second separation value are calculated for the middle phase potential, to be precise in each case to the highest and lowest phase potential, with a minimum separation value being determined from this, and then used as the basis for generation of the additional voltage. In this case, the phases are shifted upward through the up-shift value in the first half-cycle, and the additional voltage is added to the middle phase potential, while the phases are shifted down-ward through the down-shift value in the second-half cycle, and the additional voltage value is subtracted from the middle phase potential.

In the simplest case, this is done by definition of the absolute potentials of the inverter such that an extreme phase potential (for example the lowest phase potential) is identical to a potential in the intermediate circuit (for example its ground potential). For the other half-cycle, a shift value is calculated such that the opposite extreme phase potential (for example the highest) is identical to the other potential in the intermediate circuit (for example its upper potential). This shifting means that one extreme phase (that with the highest potential) corresponds to the upper intermediate-circuit voltage; the corresponding switching element of the inverter can thus be switched on and need no longer be clocked. The switching losses which occur as a result of clocking and lead to heating of the switching element are thus avoided. The shift is in the opposite direction during the subsequent half-cycle, and the lowest phase potential corresponds to the lower intermediate-circuit voltage (for example ground), as a result of which the corresponding switching element of the inverter can once again be switched on completely, and need no longer be clocked. Thus, seen over one cycle, the switching element for the highest phase potential and that for the lowest phase potential each need not be clocked for one half-cycle, that is to say for half of the cycle duration, thus correspondingly halving the switching losses.

However, this does not yet provide any improvement for the switching elements for the middle phase potential. In order to additionally reduce the thermal load on them as well, the invention makes use of a trick, by applying an additional voltage. This is chosen such that it reduces the potential of the middle phase in one of the two half-cycles down to the lower intermediate-circuit potential (or raises it to the upper intermediate-circuit potential), as a result of which the corresponding switching element likewise no longer need be clocked; for compensation, the additional voltage is correspondingly added in the other half-cycle (or reduced), in such a way that it is cancelled out over one complete cycle and therefore has virtually no effect on the generator. The invention therefore makes use of this trick to ensure that, when there are three phases, the lowest, the highest and the middle phase, the time for which clocked operation of the switching elements for the inverter is switched on is halved. The switching losses of the inverter are therefore halved. Since, in the practical embodiment of the converters, the switching losses in general dominate at least in the region of the synchronization point over the switched-on losses of the switching elements, the reduction in the switching losses according to the invention significantly affects the thermal load on the switching elements. As a result of the reduced thermal load, the current flow can in contrast be increased. The switching technique according to the invention therefore allows more torque to be transmitted even in the region of the synchronization point. The invention achieves this virtually solely by the special drive for the switching elements and the negligible additional hardware complexity for obtaining the additional voltage, and thus in a surprisingly simple manner achieves a considerable increase in the current load capacity of the converter at the synchronization point.

The expression synchronization point means an operating point at which the frequency at the rotor of the generator is virtually zero, such that the generator is rotating at the synchronous rotation speed. In this case, the synchronous rotation speed is derived from the network frequency and the number of pole pairs; for a typical asynchronous generator, this is 1500 rpm at 50 Hz. In this case, the synchronous rotation speed may vary depending on the type of generator and the network frequency. The expression a region around the synchronization point means a frequency which is about 5 Hertz above or below the synchronization point. To be more precise, this range depends on the thermal time response of the inverter stage and may vary within a range of about 0.2 Hz to 5 Hz above or below the synchronization point.

The shift is preferably carried out not only during one half-cycle, but symmetrically during both half-cycles. To this end, the up-shift, as described above, is carried out in one half-cycle to such an extent that the highest phase potential is shifted to the value of the upper intermediate-circuit potential while, in the other half-cycle, a down-shift is carried out to such an extent that the phase with the lowest phase potential is shifted to the value of the lower intermediate-circuit potential. A first and a second separation between the middle phase potential and the highest and lowest phase potentials are correspondingly determined for the middle phase in order to choose the smaller value therefrom (minimum separation), and to generate the additional voltage with this minimum separation value as amplitude. This means that, by application of an additional voltage of a magnitude such as this, the middle phase potential in at least one half-cycle is identical to the highest or lowest phase potential, that is to say it is identical to the upper or lower intermediate-circuit potential, as a result of which the corresponding switching element for the middle phase potential can be switched on permanently, and need no longer be clocked.

In this case, the frequency of the additional voltage is preferably chosen such that it corresponds to half the frequency of the voltage at the generator.

Provision is preferably also made for operation in the region of the synchronization point to be detected, and for the method according to the invention then to be carried out. The converter can then be operated in the conventional manner in the supersynchronous or subsynchronous operating range, while the reduction in the switching clock operations of the switching elements according to the invention is made use of when there is a threat of a critical thermal load, specifically during operation in the region of the synchronization point.

The converter is preferably operated at a fixed switching frequency. This offers the advantage that the method can be implemented easily in a digital control system which uses a fixed clock frequency. It is particularly preferable for the control system to be clocked in synchronism with the switching frequency. The invention therefore allows the relationship between the sampling frequency of the digital control system and the switching frequency of the converter to be retained, while nevertheless achieving the desired increased current load capacity by virtue of the reduction, according to the invention, in the frequency of the clocked switching of the individual switching elements.

The invention furthermore relates to a converter for wind energy installations having a corresponding drive circuit, which comprises a potential shifter and an additional-voltage generator. For explanation of the method of operation and advantageous developments, reference is made to the above description. The invention also extends to a wind energy installation having a generator, an operating control system and an inverter operating according to the invention, with an operating-range module with a separate rotation-speed/torque operating range being provided for the converter. The operating-range module interacts, according to the invention, with a potential shifter and an additional-voltage generator. The operating-range module makes it possible to operate the wind energy installation, even at a relatively high torque, at an operating point at which the rotation speed is in the region of the synchronous rotation speed. A rotation speed such as this is frequently advantageous with respect to the noise emission from the wind energy installation, and, thanks to the circuit according to the invention, can also be used at a higher load since, thanks to the invention, there is no longer any need to be concerned about over-heating of the switching elements in the converter during operation in the region of the synchronous rotation speed. For further details, reference is made to the above description.

A switching module is expediently provided which is designed to identify operation in the region of the synchronization point and to emit a signal to the operating-range module in order that it switches according to the invention to the separate operating range in which the permitted torque in the region of the synchronization point is increased in comparison to the normal operating range. The switching module preferably has at least one further input for the torque and/or the temperature of switching elements of the converter, and identifies when a limit value is reached. If the frequency is in the region of the synchronization point, and if the current nominal value, as a measure of the torque, is above the limit value, switching takes place to the special operating range in order to carry out the method according to the invention. When these conditions are no longer present, the process switches back to normal operation.

BRIEF DESCRIPTION OF THE DRAWINGS

The invention will be explained in the following text with reference to the attached drawings, which illustrate an advantageous exemplary embodiment of the invention, and in which.

DETAILED DESCRIPTION OF THE INVENTION

Figure 1:
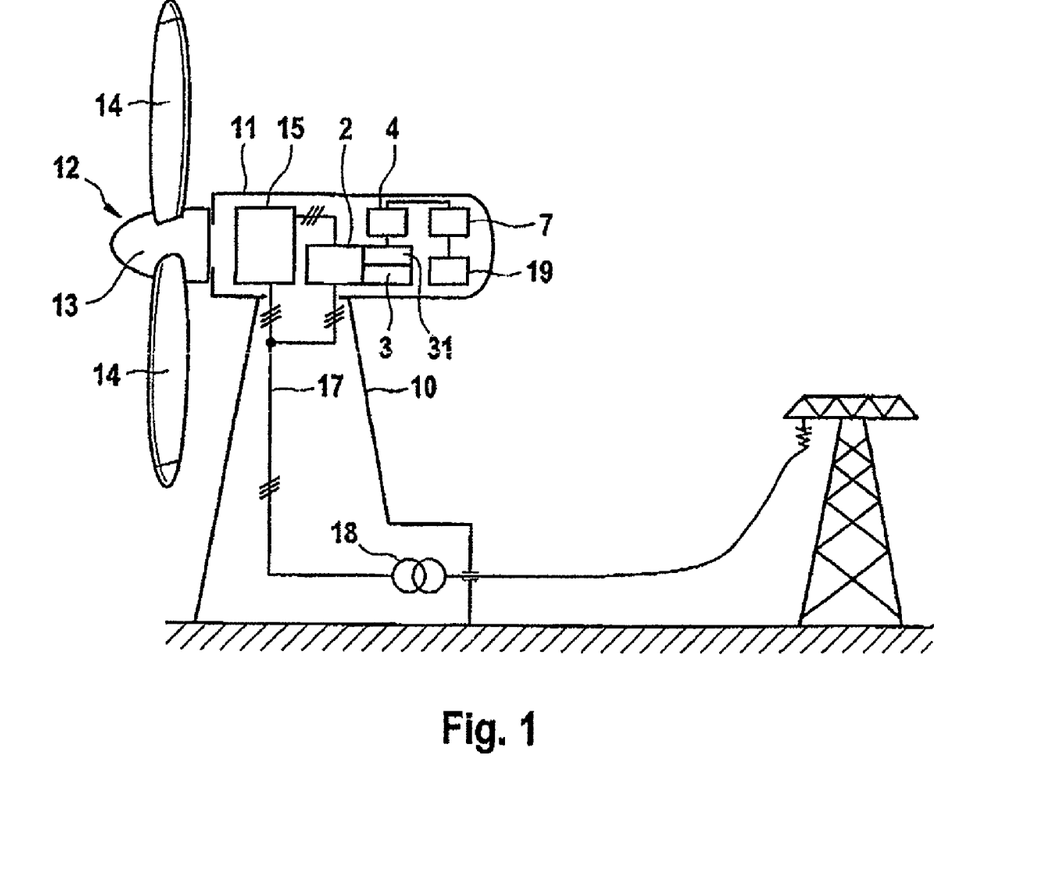
FIG. 1 shows a wind energy installation according to one exemplary embodiment of the invention.

FIG. 1 illustrates one exemplary embodiment of a wind energy installation according to the invention. This comprises a tower 10 on which a pod 11 is mounted and can pivot in the azimuth direction. A wind rotor 12 is arranged such that it can rotate on one end face of the pod 11. This wind rotor 12 comprises a hub 13 with one or more rotor blades 14, and drives a generator 15 via a rotor shaft (which is not illustrated). This generator 15 converts the mechanical power produced by the wind rotor 12 from the wind to electrical power. The generator 15 is a double-fed asynchronous machine, although other generator types may also be provided, in particular synchronous machines. A converter 2 is connected to the generator 15. A line 17 is connected to the generator 15 and to the converter 2 and it trans-ports the electrical power that is produced through the tower 10 to a medium-voltage transformer 18, which is arranged at the foot of the tower 10, in order to be passed on to a network (which is not illustrated). An operating control system 19 is also arranged in the pod 11 and monitors the operation of the entire wind energy installation. This operating control system 19 is connected to a converter control system 3, which applies control signals to the converter 2.

The generator 15 is in the form of a double-fed asynchronous machine and comprises a stator and a rotor. The electrical power produced by it is essentially passed out via the stator and the line 17 connected to it. A portion of the power flows via the rotor and the converter 2 that is connected to it.

Figure 2:
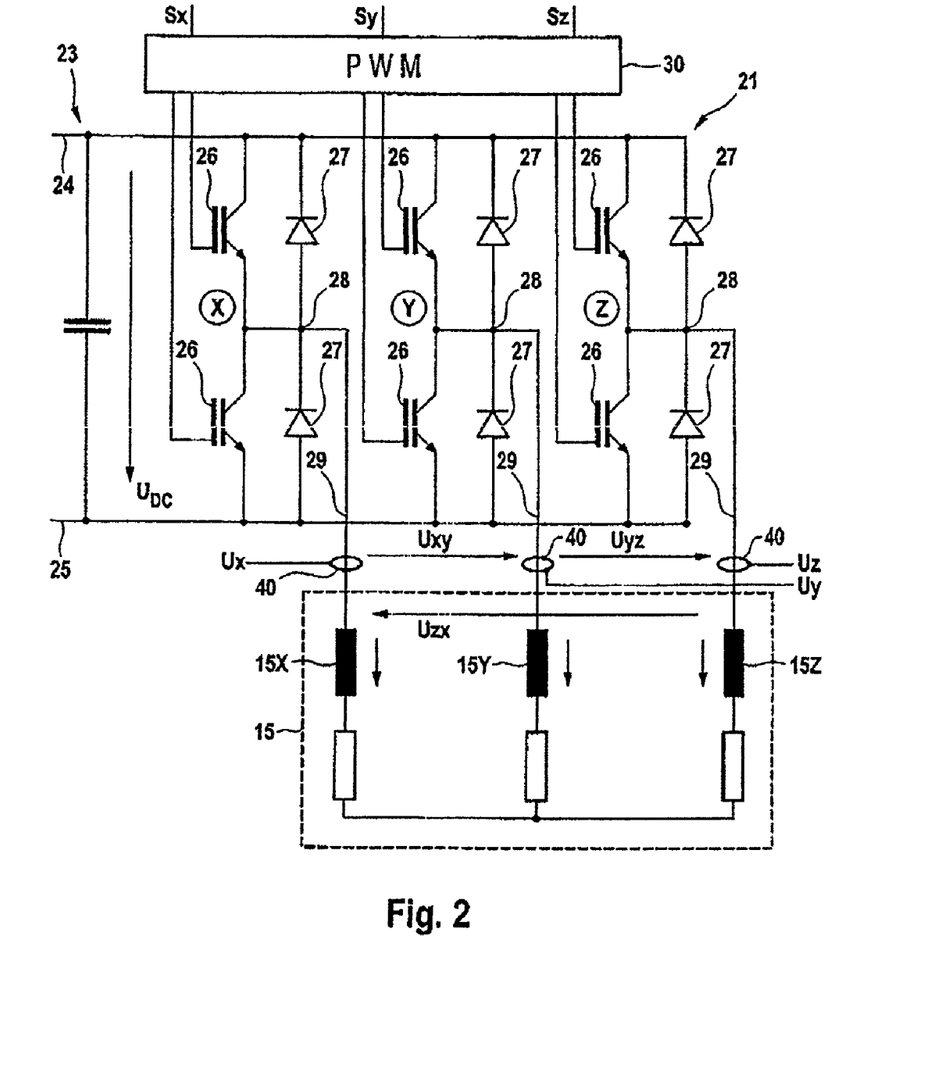
FIG. 2 shows a circuit diagram of an inverter, connected to a generator, in the wind energy installation as shown in FIG. 1.

The converter 2 comprises a generator-side inverter 21 and a network-side inverter (which is not illustrated), which are connected to one another via an intermediate circuit 23 (see FIG. 2). The generator-side inverter 21 is connected via three phases to the generator 15, and is connected via the DC voltage circuit 23 to the network-side inverter, which is in turn connected to the line 17. The figure does not show the network-side inverter, which is preferably connected via a filter circuit to the electrical network. The filter circuit is expediently designed such that harmonics of the network-side inverter are filtered out. In addition, the filter circuit must also be designed such that no resonance phenomenon occur in the wind energy installation when using the methods described in the following text. Oscillations and harmonics at half the switching frequency, or at the normal switching frequency, of the generator-side inverter must therefore be taken into account.

FIG. 2 illustrates the design of the generator-side inverter 21, which has two potential rails 24, 25, to which the DC voltage intermediate circuit 23 is connected. The upper potential rail 24 is at the higher potential of the intermediate circuit, and the lower potential rail 25 is at its lower potential, thus resulting in the intermediate-circuit voltage between them. The potentials in the DC voltage intermediate circuit 23 are not defined with respect to ground, but their potentials are related to one another. The difference between the potentials of the potential rails 24, 25, that is to say the intermediate-circuit voltage, is in this case derived from the output voltage at the network-side inverter, and can be calculated using the formula $U_{DC}=U_{network}*\sqrt{2}*$control margin. For example, the maximum potential between the potential rails 24, 25 with a control margin of 120% and an output voltage of $U_{network}=690$ V is about $U_{DC}=1170$ V. The potential rails 24, 25 may intrinsically assume any desired value with respect to ground, in which case the value need not be constant over time but can jump very quickly "backward and forward" by clocking of the network-side inverter. In the illustrated exemplary embodiment, the lower potential is connected to ground and the higher potential is at an intermediate-circuit voltage $U_{DC}$ of 1100 volts, in order to simplify the explanation.

Six switching elements 26 are connected between the potential rails 24, 25 and are connected in parallel in three groups X, Y, Z, each having two switching elements arranged in series. The switching elements 26 are any desired semiconductors that are suitable for inverters, preferably IGBTS. Two free-wheeling diodes 27 are arranged at the neutral point 28 of each group X, Y, Z and are each connected back-to-back in parallel with the switching elements 26. One phase line 29 is in each case connected to the neutral points 28, and is in each case connected to one rotor winding 15X, 15Y, 15Z of the generator 15. The phase lines 29 are each at a potential Ux, Uy and Uz, respectively. Each of the rotor windings 15X, 15Y, 15Z has an inductance L and a resistance R, which in this example are linked in the form of a star and are represented by corresponding equivalent elements. The relationships also apply in the same sense to delta linking, but these can be described only with difficulty. The respective voltage on the rotor windings 15X, 15Y, 15Z is Uxy, Uyz and Uzx.

Figure 3:
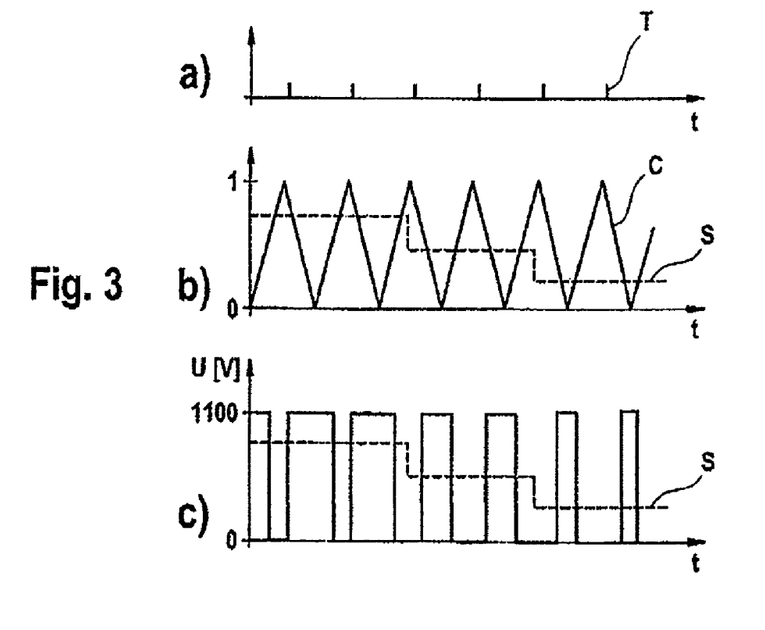
FIG. 3 shows circuit diagrams relating to the drive of switching elements in the inverter as shown in FIG. 2.

The converter control system 3 has a pulse-width modulator 30 in order to drive the switching elements 26 of the converter 2. This pulse-width modulator 30 is designed to drive switching elements of the converter as a function of reference signals which are transmitted from the operating control system 19. The pulse-width modulator 30 is operated at a switching frequency which is in synchronism with the sampling frequency of the operating control system 19. The times for the corresponding switching frequency clock pulses T result from the reciprocal of the switching frequency and are illustrated for a single-phase example in FIG. 3a. A triangular-waveform carrier signal C is illustrated, with the switching frequency, in FIG. 3b. A dashed line in the figure also shows a manipulated variable signal S, which is applied from the operating control system 19, for the converter. The carrier signal C is modulated with the manipulated-variable signal S by always interrupting a drive signal precisely when the carrier signal is greater than the manipulated-variable signal. The digital drive signal obtained in this way is applied as a complementary signal pair to control inputs of the switching elements 26 of the groups X, Y, Z. The corresponding phase line 29 therefore has a voltage profile as is illustrated in FIG. 3c. By comparison with the original manipulated-variable signal, which is once again shown by dashed lines, it can be seen that the voltage/time integrals of the signals match. The middle voltage, which acts on an element that is similar to low-pass filter, such as the rotor windings 15X, 15Y, 15Z, then corresponds precisely to the manipulated-variable signal.

The switching elements 26 in the inverter 21 are operated in the manner described above, and line voltages Uxy, Uyz and Uzx which correspond to the manipulated-variable signal are produced on the phase lines 29. This is known per se as a pulse-width-modulated converter and therefore does not need to be described in any more detail.

According to the invention, an additional drive circuit 4 having a potential shifter 5 and an additional-voltage generator 6 is provided for the converter 2. This is illustrated in detail in FIG. 5. Voltage sensors 40 can be provided, as illustrated in FIG. 2, as input signals for the potentials in the phase lines 29, and their measured values are applied as input signals to the potential shifter 5 and to the additional-voltage generator 6. However, it is preferable not to use direct measured values but, instead of this, to evaluate the manipulated-variable signals Sx, Sy, Sz of the pulse-width modulator 30.

Figure 5:
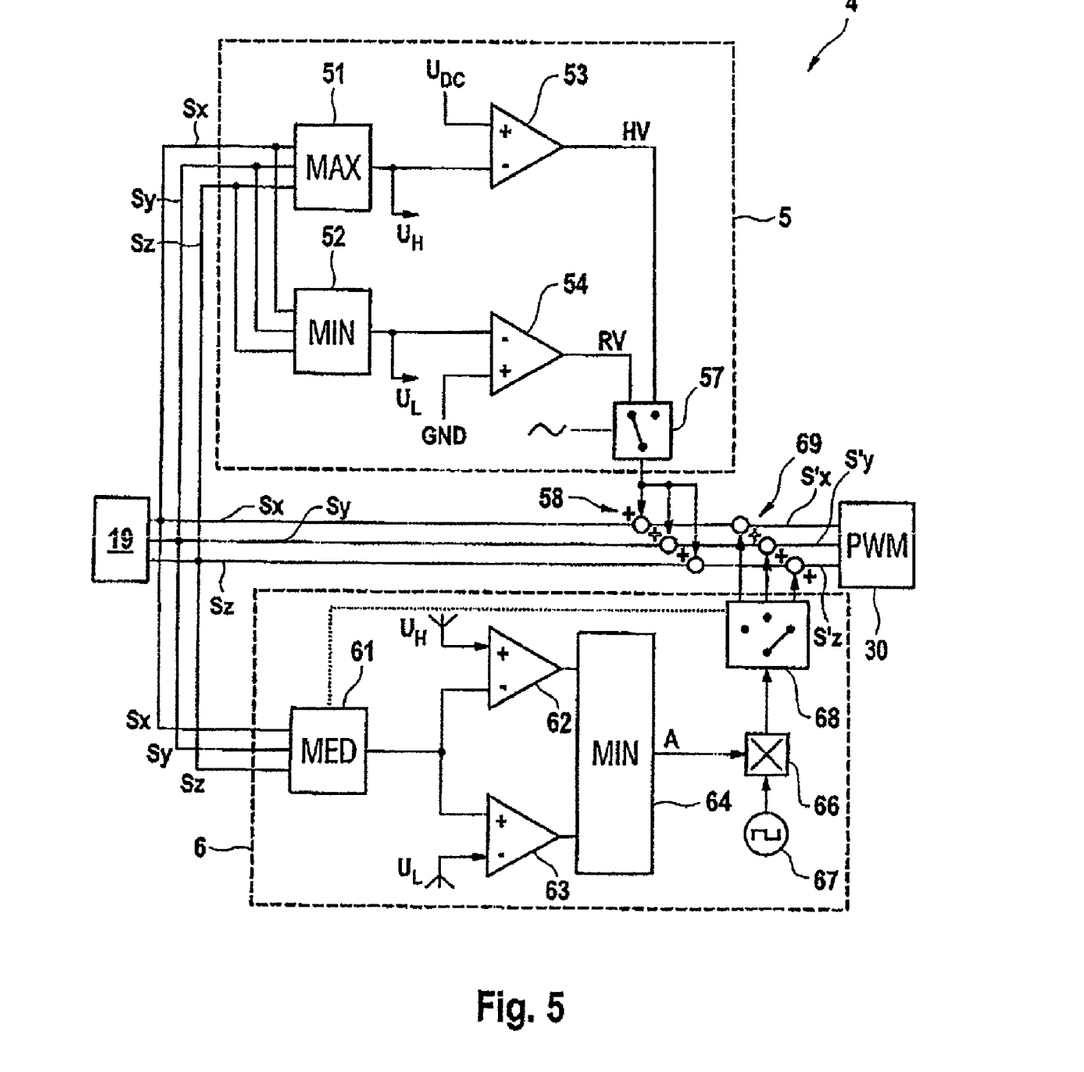
FIG. 5 shows a schematic diagram of a drive according to the invention for the switching elements shown in FIG. 3.

The potential shifter 5 has a maximum selector 51, which determines the phase line which has the least separation from the upper potential rail, and uses a first calculation unit 53 to determine what the difference is between the potential of this phase line ($U_H$) and the potential on the upper potential rail ($U_{DC}$=1100 volts), and, from this, an up-shift value HV. A minimum selector 52 is correspondingly provided and determines the phase line which has the least separation from the lower potential rail (ground), and a second calculation unit 54, which determines what the difference is between the potential on this phase line ($U_L$) and the lower potential rail, and uses this to determine a down-shift value RV. The value for which the potential of the phase (highest phase) which has the highest potential value must be shifted upward in order to be raised to the level of the upper potential rail and thus to the intermediate-circuit voltage is determined in this way. The value through which the potential of the phase (lowest phase) which has the lowest potential value must be reduced in order to be reduced to the level of the lower potential rail (ground potential) is determined in a corresponding manner. These values are applied alternately via a half-cycle-synchronized switching element 57 to the potential shifter 58, which shifts the phase lines upward through the up-shift value in one half-cycle, and shifts them downward through the down-shift value in the subsequent half-cycle.

There is necessarily one phase whose potential is between the highest and the lowest phase. This phase (middle phase) is determined by the additional-voltage generator 6 by means of a third calculation unit 61, and a calculation is carried out to determine whether the potential on the middle phase is closer to that of the highest phase ($U_H$) or to that of the lowest phase ($U_L$). Subtraction elements 62, 63 are provided for this purpose, calculate the potential difference from the highest phase and lowest phase, and apply this to a minimum detector 64. This minimum detector 64 determines the lower value, and emits this as the separation value A. This separation value A is applied to a modulator 66 of a sinusoidal-voltage generator 67, which produces a sinusoidal voltage with an amplitude corresponding to the separation value and at the same frequency as the phase lines. That phase line to which the sinusoidal additional voltage should be added by an adding element 69 is selected via an input circuit 68 on the basis of a control signal (dotted line in FIG. 5) produced by the third calculation unit 61. It should be noted that the additional voltage need not necessarily be sinusoidal, but is applied as a value that is constant over time for each half-cycle.

The signals modified in this way are applied as manipulated-variable signals S'x, S'y and S'z to the pulse-width modulator 30.

This will be explained in more detail with reference to a numerical example. Let us assume a converter with an intermediate-circuit voltage of 1100 volts and with the rotor windings having a pure resistance R of 0.010 ohms. An operating state in which the currents in the individual phase lines 29 are said to be Ix=500 A, Iy=−300 A and Iz=−200 A is chosen as an example. The voltages applied across the rotor resistance would have to be 5 V, −3 V and −2 V, respectively, in this case. This results in line voltages of Uxy=8 V, Uyz=−1 V and Uzx=−7 V. It should be noted that these values are difference voltages between the phase lines 29, which means that the absolute level of the voltages on the phase lines 29 is intrinsically undefined. Frequently, and this is assumed in the present case, the voltages will be in the region around half the intermediate-circuit voltage ($U_{DC}$=1100 V), that is to say about 550 V. This results in values of Ux=555 V, Ux=547 V and Uz=548 V for the individual phase lines.

On the basis of this value, the first calculation unit 51 determines the phase line X to be that with the highest potential ($U_H$), and an up-shift value HV of 1100 V-555 V=545 V is calculated. In a corresponding manner, the second calculation unit 52 determines the phase line Uy to be that at the lowest potential ($U_L$), and a down-shift value RV of 547 V-0 V (ground)=547 V is calculated. The middle phase is then that with a voltage at a level of 548 V. Its separation, calculated by the subtraction elements 62, 63, from the voltage $U_H$ on the highest phase is 555 V-545 V=7 V, and that for the voltage $U_L$ of the lowest phase is 548 V-547 V=1 V. The lowest phase $U_L$ is therefore closer, and the separation value is therefore A=1

V. This is the amplitude of the additional voltage which is produced by the additional-voltage generator 5 and is applied to the middle phase.

In summary, this results in the following values for a first half-cycle:

| Phase | Voltage | Potentials between the phases: | Status | After shift + 545 V | After shift and addition of additional voltage + 1 V | Potentials between the phases: |
|---|---|---|---|---|---|---|
| X | 555 V | Uxy = +8 V | Highest | 1100 V | 1100 V = ON | Uxy = +8 V |
| Y | 547 V | Uyz = −1 V | Lowest | 1092 V | 1092 V = CLOCK | Uyz = −2 V |
| Z | 548 V | Uzx = −7 V | Middle | 1093 V | 1094 V = CLOCK | Uzx = −6 V |

As a result of the up-shift, the switching element 26 which connects the phase X to the upper potential rail can thus remain switched on (ON) and does not need to be clocked. The losses caused by the clocking (CLOCK) are therefore avoided for the phase X.

Figure 4:
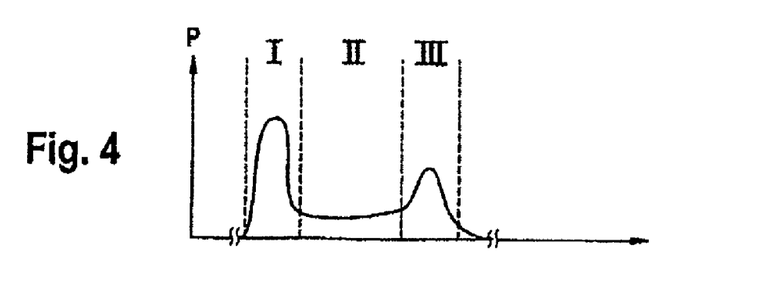
FIG. 4 shows circuit diagrams relating to switching elements as shown in FIG. 3.

Reference is made to FIG. 4, which illustrates the losses which result on switching on the switching element 26 (time period I), when the switching element 26 is switched on (time period II) and when it is switched off (time period III), additionally taking into account the losses that occur in the freewheeling diode 27. Since the switching element 26 for the phase X remains permanently switched on, only the on-state losses (II) are incurred, while the switching-on and switching-off losses (I, III), whose magnitudes are greater, are avoided. The losses can therefore be reduced by virtually two thirds.

The example will now be continued for the next, second half-cycle. The minimum selector 52 determines that phase line which is at the lowest potential. This is the phase line Y at 547 V, thus resulting in a down-shift value RV to the potential of the lower potential rail (ground) of −547 V, by means of the second calculation unit 52, 54. The amplitude of the additional voltage remains unchanged at 1 V, but is now shifted through 180 degrees in phase and, when written with the correct mathematical sign, is therefore −1 V. This results in the following values for the second half-cycle:

| Phase | Voltage | Potentials between the phases: | Status | After shift − 547 V | After shift and addition of additional voltage + 1 V | Potentials between the phases: |
|---|---|---|---|---|---|---|
| X | 555 V | Uxy = +8 V | Highest | 8 V | 8 V = CLOCK | Uxy = +8 V |
| Y | 547 V | Uyz = −1 V | Lowest | 0 V | 0 V = OFF | Uyz = 0 V |
| Z | 548 V | Uzx = −7 V | Middle | 1 V | 0 V = OFF | Uzx = −8 V |

The down-shift in the second half-cycle therefore leads to the lowest phase, phase Y, being at ground potential. Its switching element 26 can therefore be switched off (OFF) and does not need to be clocked. The phase Z, the middle phase, would intrinsically be at a voltage of 1 volt after the shift, but, by the addition of the additional voltage (as chosen according to the invention) of −1 V, the invention forces it to be at the same potential as the lowest phase which, thanks to the shift according to the invention, no longer needs to be clocked. Consequently, thanks to the additional voltage according to the invention, the middle phase also no longer needs to be clocked. The two switching elements 26 for the phases Y and Z are therefore unclocked (OFF), thus avoiding the corresponding switching losses (cf. FIG. 4).

Seen over the entire half-cycle, as a result of the combination of the up-shift and the down-shift and the additional voltage, the invention therefore means that the switching elements 26 in all the phases X, Y and Z can remain unclocked for one half-cycle, and now have to be operated in a clocked manner (CLOCK) only in the other half-cycle. The losses caused by clocking can therefore be halved thanks to the invention, which leads to a considerable reduction in the total switching losses because of the dominant influence of the clock losses on the switching losses (see FIG. 4). This reduction allows the current to be correspondingly increased, thus making it possible to likewise increase the torque at the generator. The invention therefore allows a considerable increase in the torque, as well, and in particular during operation in the region of the synchronization point, which, until now, it has been virtually impossible to use because of the risk of overheating of the switching elements.

This therefore allows low-noise operation at a low rotation speed in the region of the synchronization point at a greater load, as well.

The converter 3 does not need to be operated using the method according to the invention all the time. For simplicity, it is, in fact, desirable for it to be operated in the conventional manner over the majority of the operating range (normal operation), and for the method according to the invention (special operation) to be used only when operating in a critical operating range. To this end, a switching module 7 is provided for the converter 3 (see FIG. 6). This has an input for the frequency f in the phase lines 29 and an input for the current nominal value $I_B$ provided for the operating control system 19, and, furthermore, an input for a temperature sensor (which is not illustrated) can also optionally be provided, which measures the temperature of the switching elements 26 of the converter. It therefore monitors the frequency in the phase lines 29, that is to say the frequency acting on the rotor winding 15X, 15Y, 15z of the generator 15. If the generator 15 is in the region of the synchronization point, that is to say the frequency is below a predeterminable limit value of, for example, a frequency of 5 Hz, and if the current nominal value is above a minimum threshold at the same time, then the switching module 7 emits an appropriate output signal to the converter 3, in order that this carries out the method according to the invention. For this purpose, the switching module 7 has a logic limit with threshold value switches 71, 72, which are switched on when the frequency is in the region of the synchronization point $f_s$ and the current is above an adjustable threshold $I_{min}$ (AND logic element 75). The temperature measurement signal can optionally also be added via a further threshold value switch 73 and an OR logic element 76, thus allowing the method according to the invention to be used independently of the instantaneous current value, when the switching elements 26 exceed a limit temperature $\theta_0$. The output signal from the switching module 7 is applied to the drive circuit 4, which switches to a special rotation-speed/torque range as a function of the output signal from the operating-range module 31, and thus interacts with the potential shifter 5 and the additional-voltage generator 6 such that, according to the invention, the potentials are shifted and the additional voltage is added. If the conditions no longer exist at the inputs of the switching module 7, for example because the frequency is now outside the synchronization range, then the output signal disappears and a change is made to the normal operating range, as a result of which the converter 3 runs in normal operation.

Figure 6:
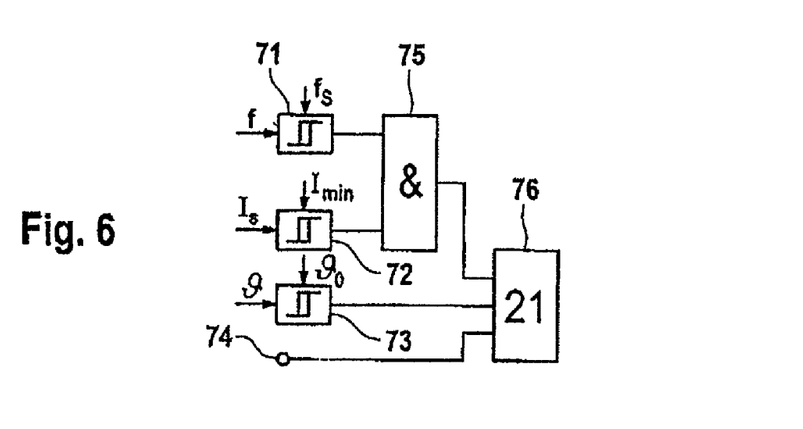
FIG. 6 shows a schematic diagram of a switching module for the inverter.

The switching module 7 optionally has an input connection 74 to which the operating control system 19 can be connected. When an appropriate request signal is applied to this input, the switching module 7 switches to special operation, as a result of which the converter 3 is switched to the method according to the invention, with the special operating range. This can be used for a test or, for example, for emergency operation, when an additional current margin is intended to be provided at the converter 3.

The invention claimed is:

1. A method of operating a converter of a wind energy installation, the converter comprising an inverter which drives a generator via a plurality of phases and an intermediate circuit having an intermediate-circuit voltage between an upper and a lower intermediate-circuit potential, wherein the generator is driven with phase potentials at a variable frequency, the method comprising:
calculating a shift value between an extreme phase potential of the phase potentials and one of the upper and the lower intermediate-circuit potentials;
determining a separation value between a middle phase potential of the phase potentials and the closest intermediate-circuit potential; and
generating an additional voltage using the separation value as an amplitude,
wherein the phase potentials are shifted through the shift value and the additional voltage is added to the middle phase potential.

2. The method of claim 1, further comprising:
calculating an up-shift value between an upper intermediate-circuit potential and the highest phase potential; and
calculating a down-shift value between the lower intermediate-circuit potential and the lowest phase potential,
wherein the determining the separation value comprises determining a first separation between the middle phase potential and a highest phase potential of the phase potentials and a second separation between the middle phase potential and a lowest phase potential of the phase potentials and forming a minimum separation value, which is used as the amplitude for generating the additional voltage.

3. The method of claim 2, further comprising:
shifting the phases through the up-shift during a first half-cycle and adding the additional voltage to the middle phase potential; and
down-shifting the phases in a second half-cycle through the down-shift value and subtracting the additional voltage from the middle phase potential.

4. The method of claim 1, 2, or 3, wherein the additional voltage is produced at half the frequency of the voltage at the generator.

5. The method of claim 1, 2, or 3, further comprising identifying operation in a region of a synchronization point and carrying out the shift according to the identification and the generation of the additional voltage.

6. The method of claim 1, 2, or 3, wherein the inverter is driven at a fixed switching frequency.

7. The method of claim 6, wherein the switching frequency is clocked in synchronism with a drive circuit.

8. A wind energy installation, comprising:
a generator driven with phase potentials at a variable frequency;
a converter;
an operating control system configured to apply at least one reference signal to the converter; and
an operating-range module provided for the converter that interacts with a potential shifter and an additional-voltage generator, the potential shifter and the additional-voltage generator being configured to perform the steps of claim 1, 2, or 3.

9. A converter for a wind energy installation, comprising:
an inverter having a plurality of phases for connection of a generator, wherein the inverter is clocked by a drive circuit; and
an intermediate circuit having an intermediate-circuit voltage between an upper and a lower intermediate-circuit potential,
wherein a potential shifter and an additional-voltage generator are provided, the potential shifter being configured to calculate a shift value between an extreme phase potential and one of the intermediate-circuit potentials and the additional-voltage generator being configured to determine a separation value between a middle phase potential and the closest intermediate-circuit potential and to determine an additional voltage with the separation value as amplitude.

10. The converter of claim 9, wherein a switching module is provided, the switching module being configured to receive signals for a frequency, identify operation in a region of a synchronization point, and emit an appropriate switching signal.

11. The converter of claim 10, wherein the switching module is further configured to receive signals for a nominal current.

12. A converter for a wind energy installation, comprising:
an inverter having a plurality of phases for connection of a generator, wherein the inverter is clocked by a drive circuit; and
an intermediate circuit having an intermediate-circuit voltage between an upper and a lower intermediate-circuit potential,
wherein a potential shifter and an additional-voltage generator are provided, the potential shifter and the additional-voltage generator being configured to perform the steps of claim 1, 2, or 3.

13. A wind energy installation, comprising:
a generator driven with phase potentials at a variable frequency;
a converter; and
an operating control system configured to apply at least one reference signal to the converter,
wherein an operating-range module is provided for the converter and interacts with a potential shifter and an additional-voltage generator, the potential shifter being configured to calculate a shift value between an extreme phase potential and one of an upper and a lower intermediate-circuit potential and the additional-voltage generator being configured to determine a separation value between a middle phase potential and the closest intermediate-circuit potential and to determine an additional voltage with the separation value as amplitude.

14. The wind energy installation of claim 13, wherein a switching module is provided, the switching module being configured to receive signals for the frequency, identify operation in a region of a synchronization point, and emit an appropriate switching signal to the operating-range module.

15. The wind energy installation of claim 14, wherein the switching module is further configured to receive signals for a nominal current.

* * * * *